(12) United States Patent
Yamaguchi

(10) Patent No.: US 10,412,263 B2
(45) Date of Patent: Sep. 10, 2019

(54) IMAGE READING DEVICE, IMAGE FORMING APPARATUS, METHOD OF REPLACING A PART OF SHADING REFERENCE DATA, AND RECORDING MEDIUM

(71) Applicant: Konica Minolta, Inc., Chiyoda-ku, Tokyo (JP)

(72) Inventor: Tomohiro Yamaguchi, Shinshiro (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/857,775

(22) Filed: Dec. 29, 2017

(65) Prior Publication Data

US 2018/0198954 A1 Jul. 12, 2018

(30) Foreign Application Priority Data

Jan. 10, 2017 (JP) .................................. 2017-001744

(51) Int. Cl.
| | |
|---|---|
| *H04N 1/40* | (2006.01) |
| *H04N 1/401* | (2006.01) |
| *H04N 1/409* | (2006.01) |
| *G03G 15/00* | (2006.01) |

(52) U.S. Cl.
CPC ........... *H04N 1/401* (2013.01); *H04N 1/4097* (2013.01); *G03G 15/5025* (2013.01); *G03G 15/5062* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 7,433,088 | B2 * | 10/2008 | Soeda | H04N 1/401 358/448 |
| 8,174,732 | B2 * | 5/2012 | Oteki | H04N 1/00002 358/3.26 |
| 10,277,776 | B2 * | 4/2019 | Fujioka | H04N 1/4076 |

(Continued)

FOREIGN PATENT DOCUMENTS

| | | |
|---|---|---|
| JP | 2005-277752 A | 10/2005 |
| JP | 2008-125006 A | 5/2008 |

(Continued)

*Primary Examiner* — Dung D Tran
(74) *Attorney, Agent, or Firm* — Buchanan Ingersoll & Rooney PC

(57) ABSTRACT

An image reading device includes: a scanner having characteristics of causing a distortion of gradation including a sine wave being formed by its obtained image data and being represented as an array of gradation values arranged in a main scanning direction; a reference member to be scanned; a hardware processor that: obtains a gradation value at each main scanning position from shading reference data obtained from the reference member; determines a target range in the shading reference data based on the gradation value at the each main scanning position; generates a substitute part of data to be replaced for an original part of data in the target range; and replaces the original part of data with the substitute part of data while the gradation values at the start and end phase of the substitute part of data are adjusted to the same of the target range.

6 Claims, 18 Drawing Sheets

(56) References Cited

U.S. PATENT DOCUMENTS

| | | | | |
|---|---|---|---|---|
| 2004/0046988 A1* | 3/2004 | Hasegawa | ............ | G03G 21/046 358/1.14 |
| 2005/0206968 A1* | 9/2005 | Sodeura | ............. | H04N 1/00002 358/474 |
| 2011/0109945 A1* | 5/2011 | Tsukahara | ............ | H04N 1/2032 358/461 |
| 2016/0173722 A1* | 6/2016 | Uchida | .............. | H04N 1/00013 358/1.9 |

FOREIGN PATENT DOCUMENTS

| | | |
|---|---|---|
| JP | 2015-23421 A | 2/2015 |
| JP | 2015-026957 A | 2/2015 |

* cited by examiner

| V~Vmin | REFn1 | REFn2 |
|---|---|---|
| 1 | 4 | 14 |
| 2 | 4 | 14 |
| 3 | 4 | 14 |
| 4 | 4 | 14 |
| 5 | 4 | 14 |
| 6 | 8 | 18 |
| 7 | 8 | 18 |
| 8 | 8 | 18 |
| 9 | 8 | 18 |
| 10 | 8 | 18 |
| 11 | 12 | 22 |
| 12 | 12 | 22 |
| 13 | 12 | 22 |
| 14 | 12 | 22 |
| 15 | 12 | 22 |
| 16 | 16 | 26 |
| 17 | 16 | 26 |
| 18 | 16 | 26 |
| 19 | 16 | 26 |
| 20 | 16 | 26 |

FIG.9

IMAGE READING DEVICE, IMAGE FORMING APPARATUS, METHOD OF REPLACING A PART OF SHADING REFERENCE DATA, AND RECORDING MEDIUM

The disclosure of Japanese Patent Application No. 2017-001744, filed on Jan. 10, 2017, including description, claims, drawings, and abstract, is incorporated herein by reference in its entirety.

BACKGROUND

Technological Field

The present invention relates to: an image reading device that reads an image on a document and is to be used in an image forming apparatus, for example; an image forming apparatus provided with this image reading device; a method of replacing a part of shading reference data; and a recording medium.

Description of the Related Art

An image reading device with a contact image sensor (CIS) is known as a common image reading device to be used in image processing apparatuses. Such an image reading device has a scanner that is provided with: a light source comprised of, for example, a light-emitting diode (LED); a light-receptive lens array such as a SELFOC lens array; and a line sensor, which are all disposed at their predetermined positions such that the light source emits light to a document and the line sensor reads an image on a document with the reflected light.

An image reading device with a SELFOC lens array as a light-receptive lens array is known for its characteristic of causing its line sensor to obtain scanned data having a cyclical distortion of gradation like a sine wave that is represented as an array of gradation values (shade values) arranged in a main scanning direction. A long-term use of such an image reading device is a cause of time-dependent deterioration of the line sensor (causes a phase shift, for example) and the light source (causes a reduction in the amount of light, for example), resulting in a lower image quality (particularly, low white level pixels).

To prevent a distortion of gradation and a lower image quality due to time-dependent deterioration as described above, such an image reading device with a SELFOC lens array is configured to perform shading correction. In shading correction, the line sensor reads a white sheetlike reference member that is referred to as a shading reference plate and corrects white level values with reference to shading reference data obtained from the reference member.

Such a reference member for shading correction may have foreign particles of paper and toner dust from a document, on its surface. In this case, when the line sensor reads the reference member, the foreign particles cause low white level values (dark pixels) in the shading reference data. When the line sensor reads a document after that, shading correction is performed such that the pixels in the scanned data, corresponding to the dark pixels in the shading reference data, becomes brighter, which results in streaks extending in a sub-scanning direction on a document image.

To solve this problem, the image reading device can be further provided with a rotating mechanism that rotates the reference member and a cleaning mechanism that cleans the reference member such that the reference member is cleaned up while being rotated at a predetermined timing. However, this will require room for the rotating and cleaning mechanism, conflicting with the trend toward device miniaturization.

Alternatively, it can be considered that a part of data in a distorted waveform range due to foreign particles is removed from the shading reference data obtained from the reference member and a substitute part for shading correction obtained and stored in advance, for example, is embedded in place of it.

Japanese Unexamined Patent Application Publication No. 2015-026957 discloses a scanner device that performs shading correction. Specifically, a low-pass filter circuit extracts a broadly distorted part that is a cause of uneven shades, from the waveform made by a light source and a sensor affected by time-dependent deterioration and temperature characteristics; a phase and amplitude modulation circuit extracts a phase-shifted part from the cyclic pattern made by a lens array; using these extracted waveform elements, a multiplier circuit composes an image signal waveform for correction. The image signal waveform for correction is removed from an image signal waveform obtained by dark level correction (offset processing).

It can be considered that a part of data in a distorted waveform range due to foreign particles is replaced with a corrected part of data. However, the deteriorating members eventually cause discontinuity in shade value in the boundary between the original and substitute part of data since they change the characteristic of shading reference data obtained from a reference member, with lapse of time.

The technology disclosed in Japanese Unexamined Patent Application Publication No. 2015-026957 is not a technology of removing a part of data in a distorted waveform range from the shading reference data and embedding a substitute part of data in place of it. So, it does not bring a solution to the present problem, failing to prevent discontinuity in shade value in the boundary between an original and substitute part of data in the shading reference data.

SUMMARY

The present invention, which has been made in consideration of such a technical background as described above, is capable of preventing streaks on a document image obtained by shading correction, by ensuring continuity in shade value in the boundary between an original and substitute part of data in a distorted waveform range in shading reference data.

A first aspect of the present invention relates to an image reading device including:
a scanner that obtains image data by scanning an image, the scanner having characteristics of causing a distortion of gradation including a sine wave, the distortion of gradation being formed by the image data, the distorted sine wave being represented as an array of gradation values arranged in a main scanning direction;
a reference member to be scanned by the scanner for shading correction; and
a hardware processor that:
obtains a gradation value at each main scanning position from shading reference data, the shading reference data obtained by the scanner from the reference member;
determines a target range in the shading reference data based on the gradation value at the each main scanning position, the target range including a distorted waveform range in the shading reference data;

generates a substitute part of data to be replaced for an original part of data in the target range; and replaces the original part of data in the target range with the substitute part of data while the gradation values at the start and end phase of the substitute part of data are adjusted to the gradation values at the start and end phase of the target range in the shading reference data, wherein the hardware processor generates the substitute part of data by using a sine wave on the basis of a trigonometric function obtained from the shading reference data.

A second aspect of the present invention relates to a method of replacing a part of shading reference data for an image reading device, the image reading device including:

a scanner that obtains image data by scanning an image, the scanner having characteristics of causing a distortion of gradation including a sine wave, the distortion of gradation being formed by the image data, the distortion of gradation being represented as an array of gradation values arranged in a main scanning direction; and a reference member to be scanned by the scanner for shading correction, the method including:

obtaining a gradation value at each main scanning position from shading reference data, the shading reference data obtained by the scanner from the reference member;

determining a target range in the shading reference data based on the gradation value at the each main scanning position, the target range including a distorted waveform range in the shading reference data;

generating a substitute part of data to be replaced for an original part of data in the target range; and replacing the original part of data in the target range with the substitute part of data while the gradation values at the start and end phase of the substitute part of data are adjusted to the gradation values at the start and end phase of the target range in the shading reference data, wherein the substitute part of data is generated by using a sine wave on the basis of a trigonometric function obtained from the shading reference data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 9 is a lookup table for detecting peaks for defining the start and end position of the target range for data replacement;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
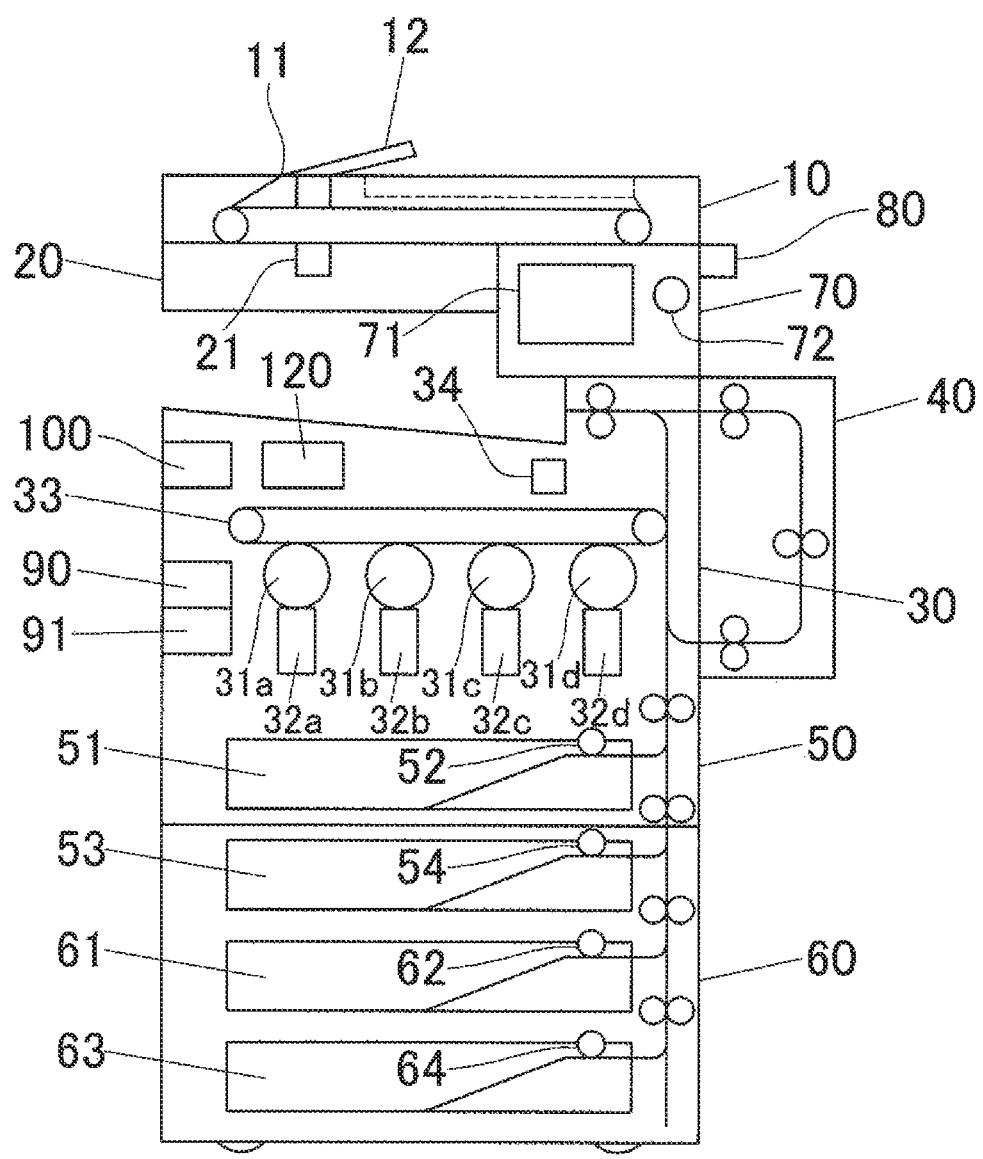
FIG. 1 illustrates a comprehensive configuration of an image forming apparatus provided with an image reading device according to one embodiment of the present invention.

FIG. 1 illustrates a comprehensive configuration of an image forming apparatus provided with an image reading device according to one embodiment of the present invention. As illustrated in this figure, the image forming apparatus is essentially provided with an automatic document feeder (ADF) 10, a document reader 20, an imaging portion 30, an automatic duplexer 40, a sheet feeder 50, a paper cabinet 60, an operation panel 70, a facsimile unit 90, a communication interface (I/F) unit 91, a controller 100, and a memory 120.

The automatic document feeder 10 is publicly known as a device that automatically conveys multiple sheets of document put on a sheet feeder tray 12, one after another, to a document scanning position predetermined on a platen that is the surface of a scanner glass of the document reader 20 and that pushes out a sheet of document onto a document sheet output tray every time the document reader 20 finishes reading it. The automatic document feeder is provided with a document placement sensor 11. The document placement sensor 11, comprised of a publicly known tactile switch, judges whether or not a document is properly placed and transmits the result of judgment to the controller 100 by signal.

The document reader 20 scans an image on a sheet of document at the document scanning position in a suitable manner for the paper size or other conditions. Subsequently, the document reader 20 receives light emitted by a light source toward the sheet of document and reflected therefrom, as an incident ray, converts the incident ray to electrical signals, then transfers them to the controller 100 as image data. The document reader 20 is provided with a device lift sensor 21. The device lift sensor 21, comprised of a publicly known magnetic sensor, judges whether or not the automatic document feeder 10 is lifted and transmits the result of judgment to the controller 100 by signal.

The operation panel 70 is publicly known as a user interface, and is provided with a display 71 serving as a touchscreen entry portion and a key entry portion 72. The operation panel 70 is further provided with a secondary power switch 80. The secondary power switch 80 is a switch that allows the user to manually switch the operation mode to sleep mode that is a power-saving mode.

The controller 100 controls the entire image forming apparatus in a unified and systematic manner. For example, the controller 100 performs various data processing tasks such as shading correction on the scanned image received and outputs signals to drive a laser diode along every main scanning line in synchronization with a sheet of paper being supplied. In this embodiment, before reading a document image, the controller 100 further obtains shading reference data for shading correction and performs a process of replacing a part of the shading reference data, which will be later described in detail.

The facsimile unit 90 is an interface for connecting a public telephone network and transmitting and receiving image data through the network.

The communication I/F unit 91 is an interface for connecting to external networks and communicating with personal computers and other apparatuses that belong to the networks. The external networks represent LANs and USBs.

The memory 120 stores image data received from the controller 100 and other data. The memory 120 is comprised of a hard disk drive (HDD), for example.

The imaging portion 30 forms an image by an electrophotographic method that is widely known. The imaging portion 30 is provided with photo-conductor drums 31a, 31b, 31c, and 31d, photo-conductor exposure units 32a, 32b, 32c, and 32d, a transfer belt 33, a front cover sensor 34, and, although it is not shown in this figure, a front cover for protecting all the preceding portions. The imaging portion 30 forms a four-color image for yellow, magenta, cyan, and black printing. In accordance with signals received from the controller 100, the photo-conductor exposure units 32a, 32b, 32c, and 32d generate laser light and expose the surfaces of the photo-conductor drums 31a, 31b, 31c, and 31d with the laser light. The front cover sensor 34 is comprised of a publicly known tactile switch and judges whether or not the front cover is open and transmits the result of judgment to the controller 100 by signal. The transfer belt 33 receives CMYK toner images from the surfaces of the photo-conductor drums 31a, 31b, 31c, and 31d one after another and transfers them onto a sheet of paper that is delivered from the sheet feeder 50.

The sheet feeder 50 is provided with paper cassettes 51 and 53 for loading sheets of paper and paper pickup rollers 52 and 54 for picking up the sheets of paper therefrom one after another. The sheet feeder 50 feeds the sheets of paper into the imaging portion 30.

Similarly, the paper cabinet 60 is provided with paper cassettes 61 and 63 for loading sheets of paper and paper pickup rollers 62 and 64 for picking up the sheets of paper therefrom one after another. The paper cabinet 60 feeds the sheets of paper into the imaging portion 30 by way of the sheet feeder 50.

The automatic duplexer 40 enables duplex printing by switching the direction of conveyance to its opposite to turn a sheet of paper with printing on one side, upside down, and feeding the sheet of paper again.

Figure 2A:
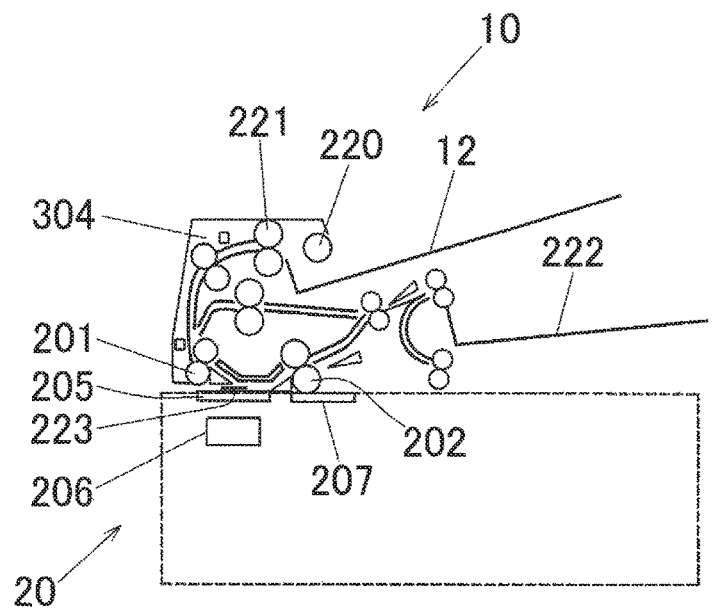
FIG. 2A schematically illustrates a configuration of an automatic document feeder 10 and an image reading device 20 in a front view of the image forming apparatus.

FIG. 2A schematically illustrates a configuration of the automatic document feeder 10 and the image reading device 20 in a front view of the image forming apparatus.

The automatic document feeder 10 is an automatic document feeder of a specific type commonly referred to as a sheet-through type, and conveys a target sheet of document to the image scanner 20. The automatic document feeder 10 may further have a function of scanning the reverse side of the sheet of document.

The image scanner 20 creates image data by reading an image on a sheet of document conveyed by the automatic document feeder 10.

As illustrated in FIG. 2A, the image scanner 20 is essentially comprised of: a scanner unit 206 provided with a photosensor; a platen 205; and a shading reference sheet 207, and reads a document image.

The automatic document feeder 10 is provided with a feed roller 220, a separation roller 221, and a pre-scan conveyance roller 201; these rollers convey a sheet of document put on the sheet feeder tray 12 to the scanning position. The scanner unit 206 creates image data in RGB format. The post-scan conveyance roller 202 is positioned adjacent to the scanning position but in the lower reaches of the document conveyance path. After a sheet of document passes through the scanning position, the post-scan conveyance roller 202 conveys the sheet of document downstream to output to a paper output tray 222. Meanwhile, the sheet of document is guided to the scanning position by a conveyance and guide member 223 in such a manner that allows it to be conveyed in a contactless manner with the platen 205. The post-scan conveyance roller 202 drives a little faster than the pre-scan conveyance roller 201 such that the sheet of document is stretched taut enough to keep from contact with the platen 205.

Although it is not shown in the figure, the sheet feeder tray 12 of the automatic document feeder 10 has a guide member that prevents sheets of document from being fed in a tilted manner by guiding them in position, and the guide member is coupled with a position sensor. The sheet feeder tray 12 further has multiple document sensors arranged in a conveyance direction. A combination of the position sensor and the document sensors allows judging the size of sheets of document put on the sheet feeder tray 12. The scanner unit 206 may slide to the position of the shading reference sheet 207 that is a white reference member and perform shading correction on a regular basis during a job.

Figure 2B:
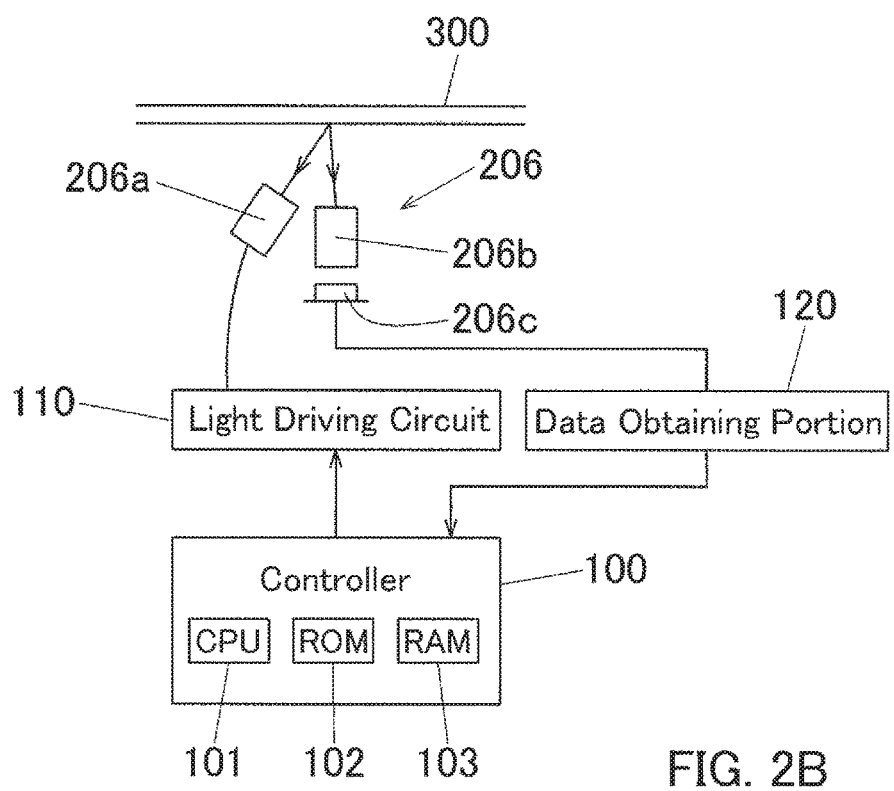
FIG. 2B illustrates a configuration of a scanner unit from FIG. 2A.

In this embodiment, the scanner unit 206 is provided with a scanning sensor comprised of a single linear array contact image sensor. Specifically, as illustrated in FIG. 2B, the scanner unit 206 is provided with: a light source 206a that emits light to a sheet of document 300; a lens array 206b that receives light reflected from the sheet of document 300; and a scanning sensor (line sensor) 206c comprised of a linear array image sensor disposed immediately underneath the lens array 206b; all these are aligned in a cross direction of the sheet of document 30 i.e. in a main scanning direction.

In this embodiment, the light source 206c is comprised of LEDs of the three colors: red (R), green (G), and blue (B). The controller 100 turns on and off the light source 206c by controlling a light driving circuit 110.

The scanning sensor 206c of the scanner unit 206 obtains image data by photoelectric conversion and transfers it to a data obtaining portion 120. The data obtaining portion 120 is comprised of an analog front-end (AFE) that performs A/D conversion on analog signals from the scanning sensor 206 i.e. that converts the analog signals to digital signals.

The controller 100 is provided with a CPU 101, a ROM 102, and a RAM 103. The CPU 101 controls the entire image forming apparatus in a unified and systematic manner; the control operations include turning on and off the light source 206a and performing processing on the digital image signals obtained by the data obtaining portion 120.

The ROM 102 is a memory that stores operation programs for the CPU 101 and other data; the RAM 103 is a memory that provides a workspace for the CPU 101 to execute the operation programs.

To scan both front and back sides of a sheet of document, the image forming apparatus may be further provided with a reversing mechanism that turns a sheet of document upside down such that the sheet of document is conveyed to the scanning position twice sequentially for the scanning of the front and back sides, or may be further provided with a dedicated scanning unit to the scanning of the back side.

The CPU 101 receives shading reference data, which is the scanned data obtained from the shading reference sheet 207 by the scanning sensor 206c, from the data obtaining portion 120. To perform shading correction, the CPU 101 determines the target range including a distorted waveform range in the shading reference data and replaces an original part of data in the target range with a substitute part of data. This processing will be further described below with reference to the block diagram of FIG. 3, illustrating a functional configuration of the CPU 101.

Figure 3:
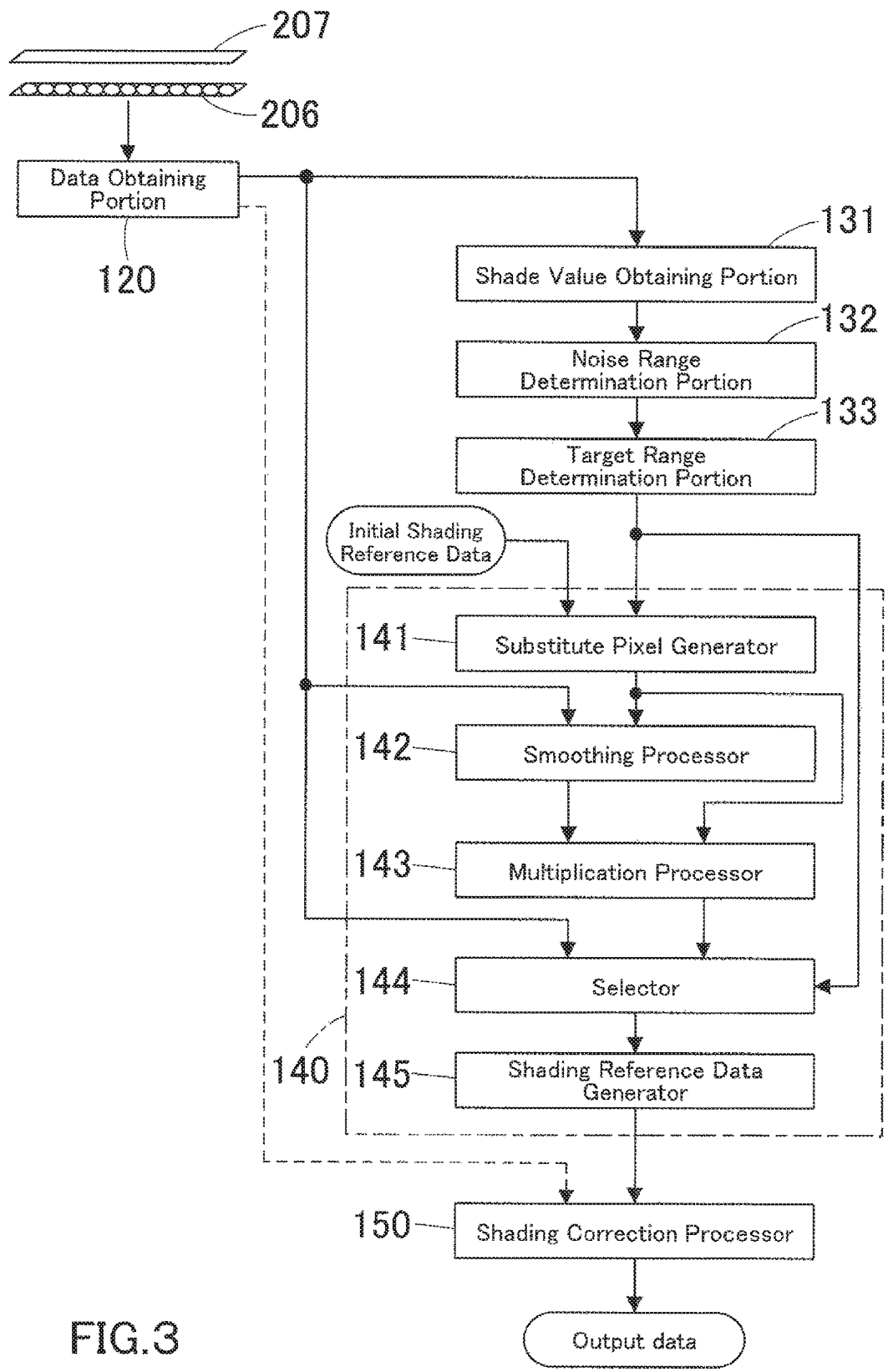
FIG. 3 is a block diagram illustrating a functional configuration of a CPU.

As referred to FIG. 3, the data obtaining portion 120 inputs the shading reference data which is obtained from the shading reference sheet 207 by the scanning sensor 206c, to a shade value obtaining portion 131.

From the shading reference data, the shade value obtaining portion 131 obtains the shade values of all pixels i.e. the shade values at all main scanning positions (main scanning coordinates).

Figure 4A:
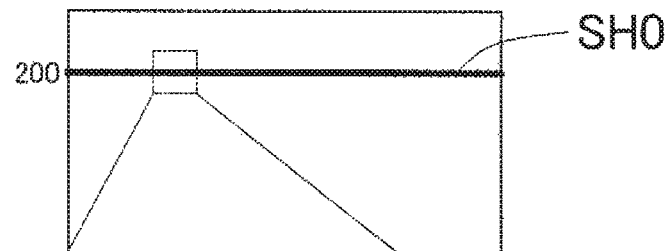
FIG. 4A is a waveform chart of shading reference data obtained from a shading reference sheet by a scanning sensor in the early stages of use of the image forming apparatus.
Figure 4B:
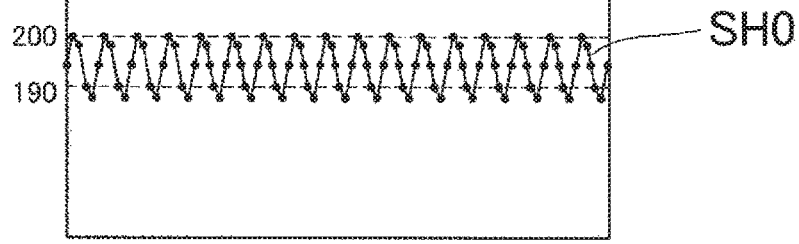
FIG. 4B is an enlarged view of a part of the waveform.

FIG. 4A is a waveform chart of shading reference data SH0 obtained from the shading reference sheet 207 by the scanning sensor 206c in the early stages of use of the image forming apparatus; FIG. 4B is an enlarged view of a part of the waveform. The transverse axis represents the position of pixel counted along a main scanning direction, and the longitudinal axis represents shade values of the same. The rightward main scanning direction (a direction to the right end of paper) is defined as a positive direction, and the leftward main scanning direction is defined as a negative direction.

As previously described, if the lens array 206b is a SELFOC lens array, for example, the data obtaining portion 120 obtains image data having a cyclical distortion of gradation extending in a main scanning direction. So, as shown in FIG. 4B, the shading reference data SH0 forms an approximate sine wave with a positive and negative peak in every cycle. In the early stages of use of the image forming apparatus, the light source 206a and the lens array 206b of the scanner unit 206 maintain their normal qualities without deterioration, the scanning sensor 206c of the scanner unit 206 also maintains its normal quality without substrate deformation, and the shading reference sheet 207 does not have yet foreign particles of paper and toner dust from a document. At this time, the shade values at the main scanning coordinates of all positive peaks in the shading reference data SH0 are approximately the same, and the shade values at the main scanning coordinates of all negative peaks in the shading reference data SH0 are approximately the same. In the early stages of use of the image forming apparatus, shading reference data (hereinafter to be referred to as initial shading reference data) is stored on the memory 120 or another recording medium. Alternatively, before shipment, initial shading reference data may be obtained and stored thereon at the factory.

Figure 5A:
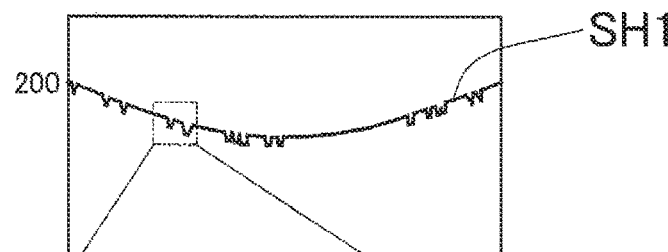
FIG. 5A is a waveform chart of shading reference data obtained by the scanning sensor when the waveform characteristic has changed by time-dependent deterioration.
Figure 5B:
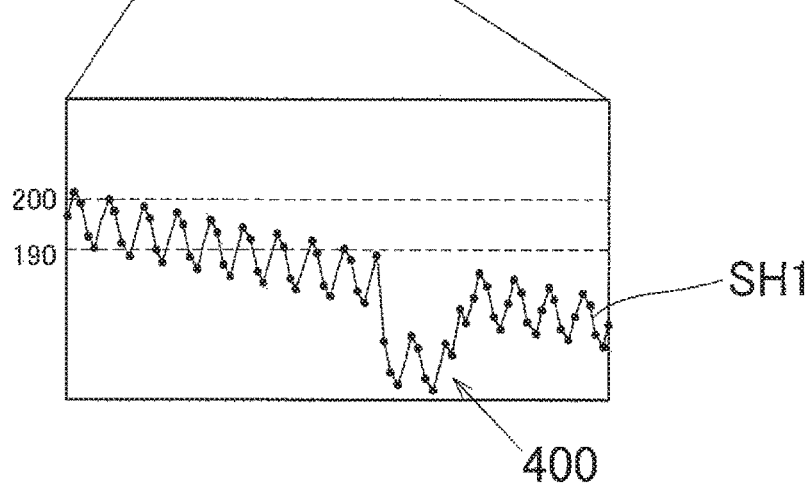
FIG. 5B is an enlarged view of a part of the waveform.

After a long-term use of the image forming apparatus, the light source 206a and the lens array 206b of the scanner unit 206 lose their normal qualities because of deterioration, and the scanning sensor 206c of the scanner unit 206 also loses its normal quality because of substrate deformation. At this time, as is understood from the shading reference data SH1 in FIG. 5A, the waveform extending in a main scanning direction is widely curved. FIG. 5B is an enlarged view of a part of the waveform of FIG. 5A. As shown in FIG. 5B, a foreign particle of toner or paper dust at a position on the shading reference sheet 207 causes a distortion (noise) 400 at the corresponding position in the waveform.

Figure 6:
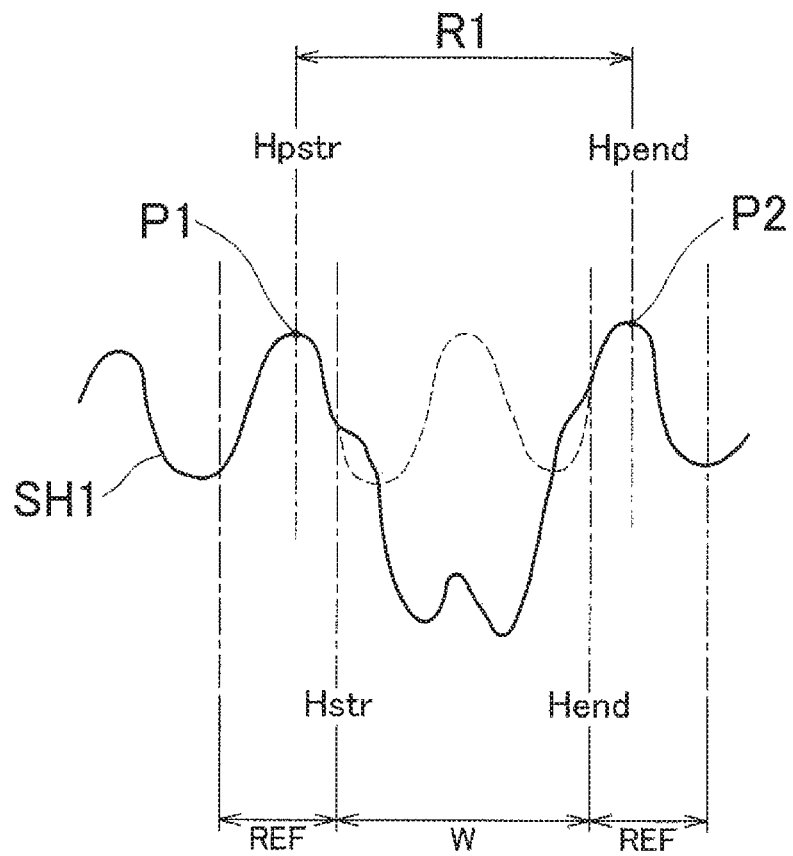
FIG. 6 is a view for reference in describing a method of determining the target range for data replacement.

A noise range determination portion 132 detects the start and end position of a distorted waveform range (hereinafter to be also referred to as a noise range) in the shading reference data SH1. In this embodiment, as shown in FIG. 6, the shade values obtained by the shade value obtaining portion 131 form a distorted sine wave, and the noise range determination portion 132 detects the start position Hstr and the end position Hend by searching for two breakpoints in the distorted sine wave. The noise range determination portion 132 may detect the start position Hstr and the end position Hend by searching for two striking changes in the distorted sine wave. The noise range W is determined by the start position Hstr and the end position Hend.

A target range determination portion 133 determines the target range, a part of data in which will be replaced with a substitute part of data. As shown in FIG. 6, the shading reference data SH1 forms a distorted sine wave with multiple peaks in shade value. The target range determination portion 133 defines the start position Hpstr as the main scanning coordinate of a peak P1 that is within a reference distance REF to the left (to the negative direction) of the start position Hstr of the noise range W determined by the noise range determination portion 132. Similarly, the target range determination portion 133 defines the end position Hpend as the main scanning coordinate of a peak P2 that is within a reference distance REF to the right (to the positive direction) of the end position Hend of the noise range W determined by the same.

The target range R1 is determined by the start position Hpstr and the end position Hpend. The reference distance REF is determined in advance with reference to the cycles of the shading reference data SH0 such that one peak, the peak P1 for defining the start position Hpstr of the target range R1, is to the left of the noise range W and one peak, the peak P2 for defining the end position Hpend of the target range R1, is to the right of the noise range W.

Subsequently, a data replacement portion 140 removes an original part of data in the target range R1 from the shading reference data SH1 and embeds a substitute part of data in place of it. The data replacement process will be later described in detail.

As described above, in this embodiment, the start position Hpstr and the end position Hpend of the target range R1 are defined as the main scanning coordinates of the peaks P1 and P2 in a sine wave. So, the target range R1 is extremely small; this extremely small target range contributes to the precision of continuity in the boundary. With reference to corrected shading reference data obtained in this manner, shading correction can be successfully performed. The image forming apparatus is thus allowed to prevent streaks on an image by ensuring continuity in shade value in the boundary between an original and substitute part of data. Furthermore, in this embodiment, the start position Hpstr of the target range R1 is defined as the main scanning coordinate of the peak P1 that is within a predetermined range to the left of the start position Hstr of the distorted waveform range W, and the end position Hpend of the target range R1 is defined as the main scanning coordinate of the peak P2 that is within a predetermined range to the right of the end position Hend of the distorted waveform range W. So, the target range R1 is limited to the extent absolutely necessary.

Figure 7:
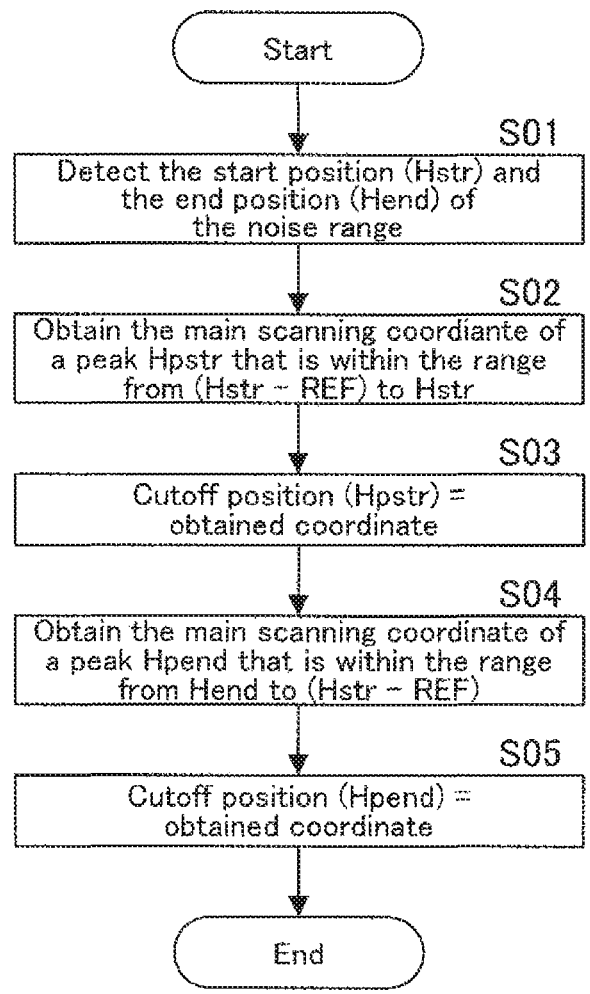
FIG. 7 is a flowchart representing a process of determining the target range for data replacement.

FIG. 7 is a flowchart representing the above-described process of determining the target range for data replacement. The image forming apparatus performs the processes represented by the flowcharts of FIG. 7 and the following figures, by the CPU 101 running operation programs stored on a recording medium such as the ROM 12.

In Step S01, the start position Hstr and the end position Hend of the distorted waveform range (noise range) W are detected. In Step S02, the main scanning coordinate of the peak P1 that is within the predetermined reference distance REF to the left (to the negative direction) of the start position Hstr of the noise range W is obtained; the range is from (Hstr−REF) to Hstr in other words. In Step S03, the cutoff position (the start position Hpstr of the target range R1) is defined as the main scanning coordinate of the peak P1 which is obtained in the previous step.

Subsequently, in Step S04, the main scanning coordinate of the peak 2 that is within the predetermined reference distance REF to the right (to the positive direction) of the end position Hend of the noise range W is obtained; the range is from Hend to (Hend+REF) in other words. In Step 505, the end position Hpend (of the target range R1) is defined as the main scanning coordinate of the peak P2 which is obtained in the previous step.

Figure 8:
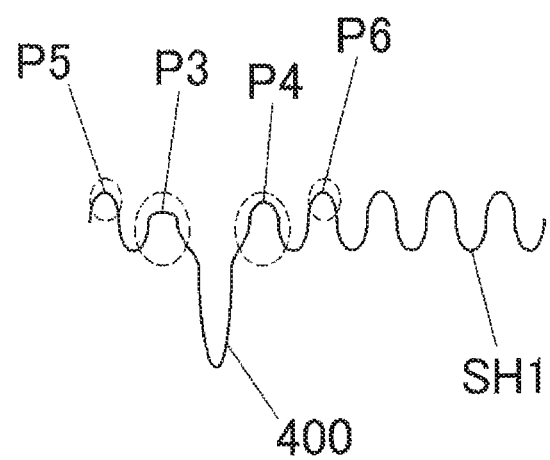
FIG. 8 is a view for reference in describing a method of determining the target range for data replacement when a foreign particle causes a striking difference in shade value.

In another case, it is absolutely possible that a foreign particle causes a striking difference in shade value and a very low minimum shade value, which is the distortion 400 indicated in FIG. 8. In this case, the distortion 400 impacts on the shade values of the peaks P3 and P4 that are to the left and right of and adjacent to the same noise range W which is determined by the same start position Hstr and the same end position Hend. If the start position Hpstr of the target range R1 is defined as the main scanning coordinate of the peak P3 that is to the left of and adjacent to the noise range W and the end position Hpend of the target range R1 is defined as the main scanning coordinate of the peak P4 that is to the right of and adjacent to the noise range W, the quality of shading correction will be compromised because the distortion 400 further impacts on the shade values beyond the target range R1. So, in this case, it is preferred that the start position Hpstr of the target range R1 be defined as the main scanning coordinate of the peak P5 that is further to the left and the end position Hpend of the target range R1 be defined as the main scanning coordinate of the peak P6 that is further to the right.

In this embodiment, the target range R1 should be wider when a foreign particle causes a striking difference in shade value, which will be further described below.

The target range determining portion 133 obtains the minimum shade value in the noise range W and the shade value at the main scanning coordinates of a peak that is within the predetermined reference distance REF to the right or left of the noise range W, with reference to the shade values at all main scanning coordinates, which are obtained by the shade value obtaining portion 131. The target range determining portion 133 then calculates the difference between the shade value at the peak and the minimum shade value in the noise range W.

Meanwhile, a lookup table determines the reference distance REF for detecting the peaks for defining the start position Hpstr and the end position Hpend of the target range R, depending on the difference between the shade value at the peak and the minimum shade value in the noise range W. This table is stored in advance on a recording medium such as the ROM 103. FIG. 9 shows an example of this lookup table.

In the lookup table of FIG. 9, the minimum shade value in the noise range W is represented by Vmin; the shade value at the main scanning coordinate of a peak that is within the predetermined reference distance REF to the right or left of the noise range W is represented by V; and the difference between the shade value at the peak and the minimum shade value in the noise range W is represented by the expression V−Vmin. Furthermore, a first reference distance to the left of the start position Hstr of the noise range W and a first reference distance to the right of the end position Hend of the noise range W are each represented by REFn1; a second reference distance to the left of the start position Hstr of the noise range W and a second reference distance to the right of the end position Hend of the noise range W are each represented by REFn2. While the relationship between REFn1 and REFn2 can be represented by the inequality REFn2>REFn1; V−Vmin is configured to be directly proportional to both REFn1 and REFn2. By calculating V−Vmin, the target range determination portion 133 obtains the difference between the shade value V at the main scanning coordinate of a peak that is within the predetermined reference distance REF to the right or left of the noise range W, and the minimum shade value in the noise range W. The target range determination portion 133 then obtains REFn1 and REFn2 that correspond to V−Vmin from the lookup table. The target range determination portion 133 obtains the shade value at a peak that is within the first reference distance REFn1 to the left of the start position Hstr of the noise range W and the shade value at a peak that is within the first reference distance REFn2 to the right of the end position Hend of the noise range W. Similarly, the target range determination portion 133 further obtains the shade value at a peak that is within the second reference distance REFn2 to the left of the start position Hstr of the noise range W and the shade value at a peak that is within the second reference distance REFn2 to the right of the end position Hend of the noise range W.

As described above, the minimum shade value Vmin in the noise range W and the shade value V at a peak that is within the predetermined reference distance REF to the right or left of the noise range W are obtained. The difference between the shade value V at the peak and the minimum shade value Vmin is obtained by calculating V−Vmin, and the reference distances (REFn1 and REFn2) that correspond to V−Vmin are obtained from the lookup table. With these reference distances, peaks for defining the start position Hpstr and the end position Hpend of the target range R1 are detected. The image forming apparatus is thus allowed to successfully define the start position Hpstr and the end position Hpend of the target range R1 depending on the degree of the impact of the distortion 400 i.e. depending on the condition of a foreign particle.

Figure 10:
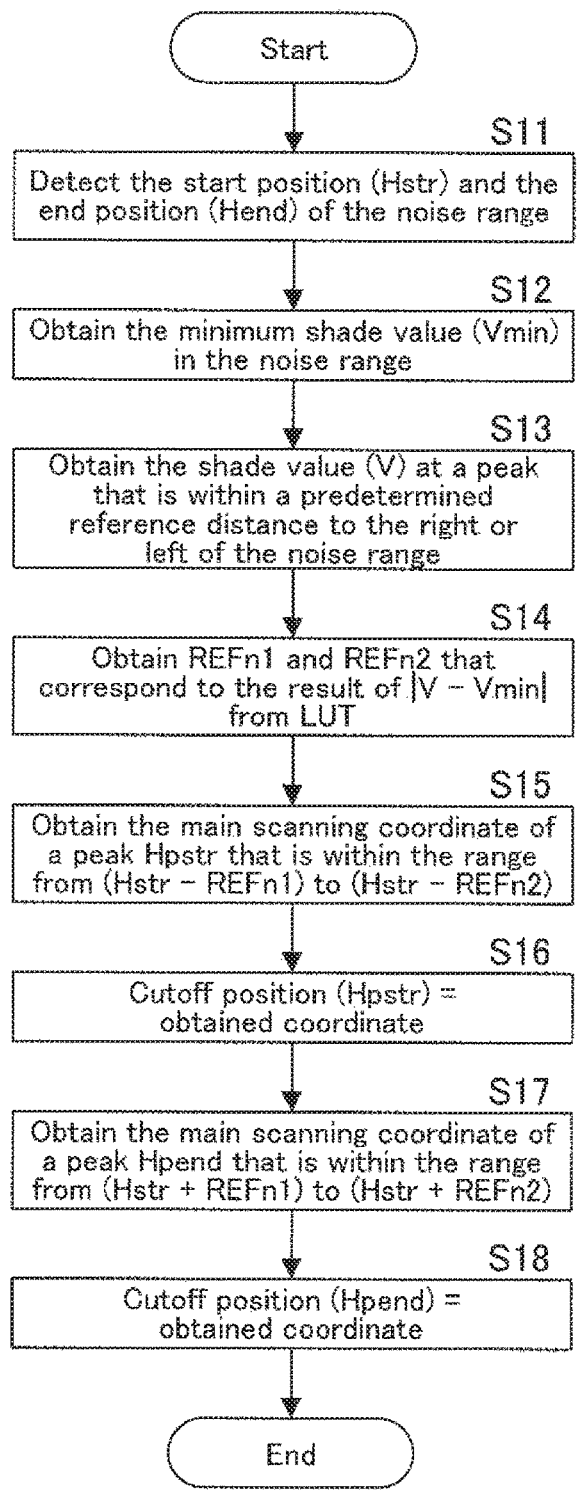
FIG. 10 is a flowchart representing a process of determining the target range for data replacement when a foreign particle causes a striking difference in shade value.

FIG. 10 is a flowchart representing a process of determining a target range R1 when a foreign particle causes a striking difference in shade value.

In Step S11, the start position Hstr and the end position Hend of the distorted waveform range (noise range) W are detected. In Step S12, the minimum shade value Vmin in the noise range W is obtained; in Step S13, the shade value V at a peak that is within the predetermined reference distance REF to the right or left of the noise range W is obtained. In Step S14, REFn1 and REFn2 that correspond to the difference V−Vmin are obtained from the lookup table (LUT).

In Step S15, the main scanning coordinate of a peak that is within the range from the position the first reference distance REFn1 to the left (to the negative direction) of the start position Hstr of the noise range W to the position the second reference distance REFn2 to the left (to the negative direction) of the start position Hstr of the noise range W is obtained; the range is from (Hstr−REFn1) to (Hstr−REFn2) in other words. In Step S16, the cutoff position (the start position Hpstr of the target range R1) is defined as the main scanning coordinate of the peak which is obtained in the previous step.

Subsequently, in Step S17, the main scanning coordinate of a peak that is within the range from the position the first reference distance REFn1 to the right (to the positive direction) of the end position Hend of the noise range W to the position the second reference distance REFn2 to the right (to the positive direction) of the end position Hend of the noise range W is obtained; the range is from (Hstr+REFn1) to (Hstr+REFn2) in other words. In Step S18, the cutoff position (the end position Hpend of the target range R1) is defined as the main scanning coordinate of the peak which is obtained in the previous step.

Figure 11:
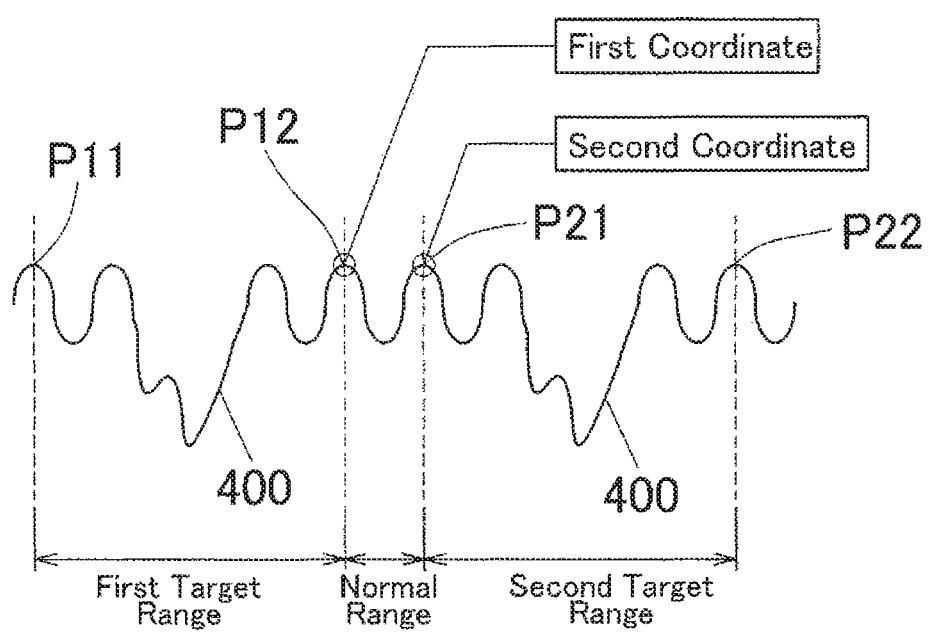
FIG. 11 is a view for reference in describing a process of consolidating multiple target ranges for data replacement into one when these are adjacent to each other.

In yet another case, it is absolutely possible that two or more foreign particles on the shading reference sheet 207 cause two or more noise ranges W and two or more target ranges R. For example, a first target range R11 and a second target range R12 are adjacent to each other as shown in FIG. 11. If the first target range R11 and the second target range R12 are subjected to data replacement separately, the process will be complex. If the first target range R11, the second target range R12, and the normal range between the foregoing target ranges are consolidated into one then subjected to data replacement at one time, the process will be simple, and data replacement in the normal range will hardly compromise the quality of shading correction.

So, it is preferred that, when the first target range R11 and the second target range R12 are adjacent to each other, the first target range R11, the second target range R12, and the normal range between the foregoing target ranges be consolidated into one then subjected to data replacement at one time.

Specifically, as shown in FIG. 11, there are four peaks: peaks P11, P12, P21, and P22. The start and end position of the first target range R11 are defined as the main scanning coordinates of the peaks P11 and P12, and the start and end position of the second target range R12 are defined as the main scanning coordinates of the peaks P21 and P22. The peak P12 on first target range R11 and the peak P21 on the second target range R12 are adjacent to each other. The main scanning coordinate of the peak P12 is obtained as a first coordinate, and the main scanning coordinate of the peak P21 is obtained as a second coordinate. The target range determination portion 133 judges whether or not the difference between the first and second coordinate is equal to or below a threshold. If it is equal to or below a threshold, the target range determination portion 133 consolidates the first target range R11, the second target range R12, and the normal range between the foregoing target ranges, into one target range.

Figure 12:
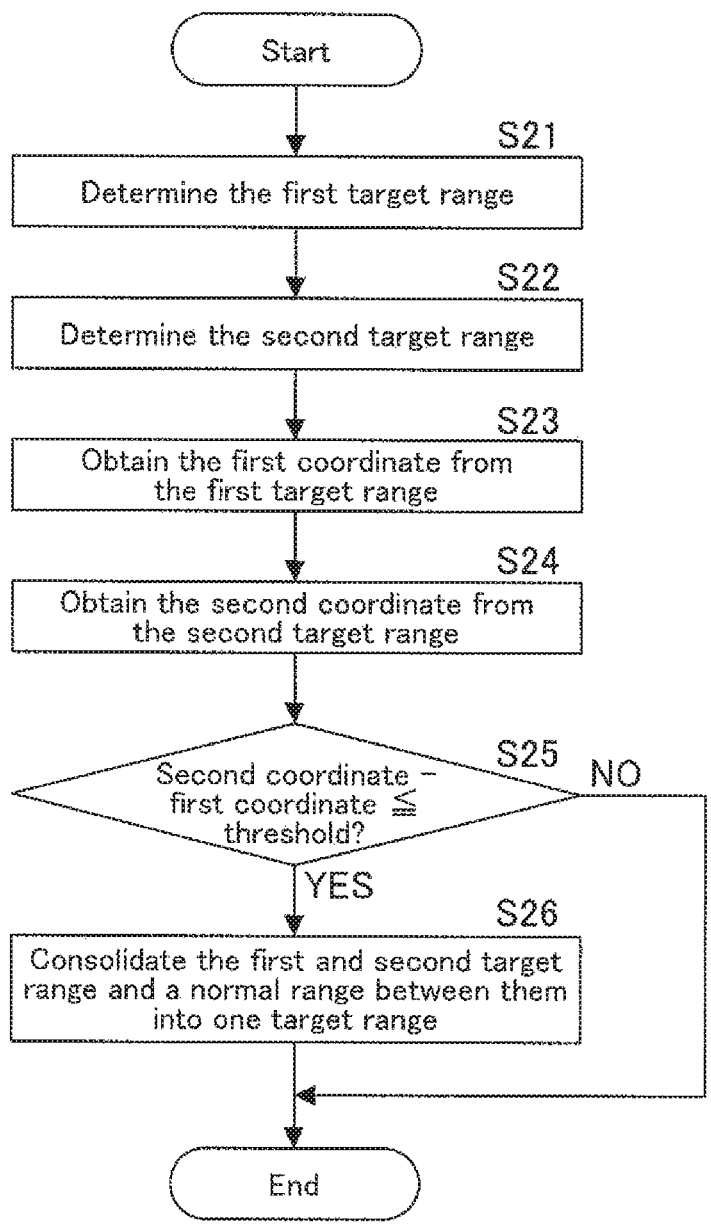
FIG. 12 is a flowchart representing a process of consolidating multiple target ranges for data replacement into one.

FIG. 12 is a flowchart representing a process of consolidating the first target range R11, the second target range R12, and the normal range between the foregoing target ranges into one target range.

In Step S21, the first target range R11 is determined; in Step S22, the second target range R22 is determined. Meanwhile, there are four peaks: peaks P11, P12, P21, and P22. The start and end position of the first target range R11 are defined as the main scanning coordinates of the peaks P11 and P12, and the start and end position of the second target range R12 are defined as the main scanning coordinates of the peaks P21 and P22. The peak P12 on the first target range R11 and the peak P21 on the second target range R12 are adjacent to each other. In Step S23, the main scanning coordinate of the peak P12 is obtained as a first coordinate; in Step S24, the main scanning coordinate of the peak P21 is obtained as a second coordinate.

In Step S25, it is judged whether or not the difference between the first and second coordinate is equal to or below a threshold. If it is equal to or below a threshold (YES in Step S25), the routine proceeds to Step S26 in which the first target range R11, the second target range R12, and the normal range between the foregoing target ranges are consolidated into one target range.

In Step S25, if the difference between the first and second coordinate is not equal to or below a threshold (NO in Step S25), the routine terminates. Consequently, the first target range R11 and the second target range R12 will be subjected to data replacement separately.

As described above, when the first target range R11 and the second target range R12 are adjacent to each other, the first target range R11, the second target range R12, and the normal range between the foregoing target ranges are consolidated into one then subjected to data replacement at one time. In contrast, it is preferred that, even when the first target range R11 and the second target range R12 are adjacent to each other, the first target range R11 and the second target range R12 be subjected to data replacement separately, on the condition that the first target range R11 and the second target range R12 show significantly different data characteristics.

Figure 13:
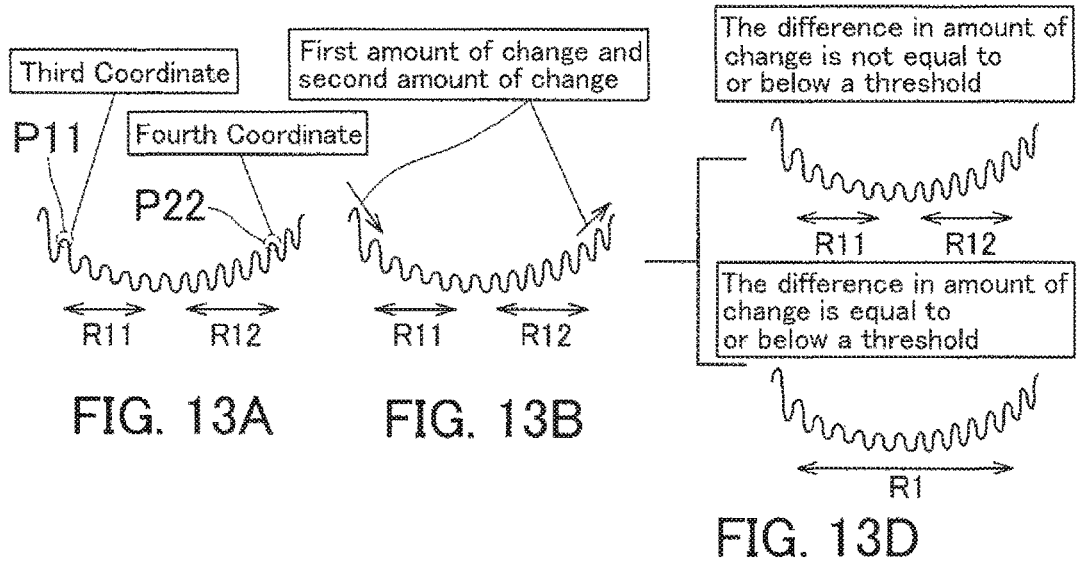
FIGS. 13A to 13D are views for reference in describing a process of retaining multiple target ranges for data replacement without consolidating even when these are adjacent to each other.

It is therefore necessary to judge the difference in data characteristic between the first target range R11 and the second target range R12 as described below. As shown in FIG. 13A, there are four peaks: peaks P11, P12, P21, and P22. The start and end position of the first target range R11 are defined as the main scanning coordinates of the peaks P11 and P12, and the start and end position of the second target range R12 are defined as the main scanning coordinates of the peaks P21 and P22. The peak P11 on the first target range R11 and the peak P22 on the second target range R12 are the most distant from each other. The main scanning coordinate of the peak P11 is obtained as a third coordinate, and the main scanning coordinate of the peak P22 is obtained as a fourth coordinate. As shown in FIG. 13B, the target range determination portion 133 calculates a first amount of change that is the average of the shade values at positions adjacent to the third coordinate and a second amount of change that is the average of the shade values at positions adjacent to the fourth coordinate. The target range determination portion 133 then judges whether or not the difference between the first and second amount of change is equal to or below a threshold i.e. whether or not the first target range R11 and the second target range R12 show similar data characteristics. On the condition that the difference between the first and second amount of change is equal to or below a threshold, the target range determination portion 133 consolidates the first target range R11, the second target range R12, and the normal range between the foregoing target ranges into one, as shown in FIG. 13D, when the first target range R11 and the second target range R12 are adjacent to each other. In contrast, on the condition that the difference between the first and second amount of change is not equal to or below a threshold, the target range determination portion 133 retains the first target range R11, the second target range R12, and the normal range between the foregoing target ranges without consolidating, as shown in FIG. 13C, even when the first target range R11 and the second target range R12 are adjacent to each other. The image forming apparatus is thus allowed to successfully perform data replacement depending on the characteristic of the shading reference data SH1.

Figure 14:
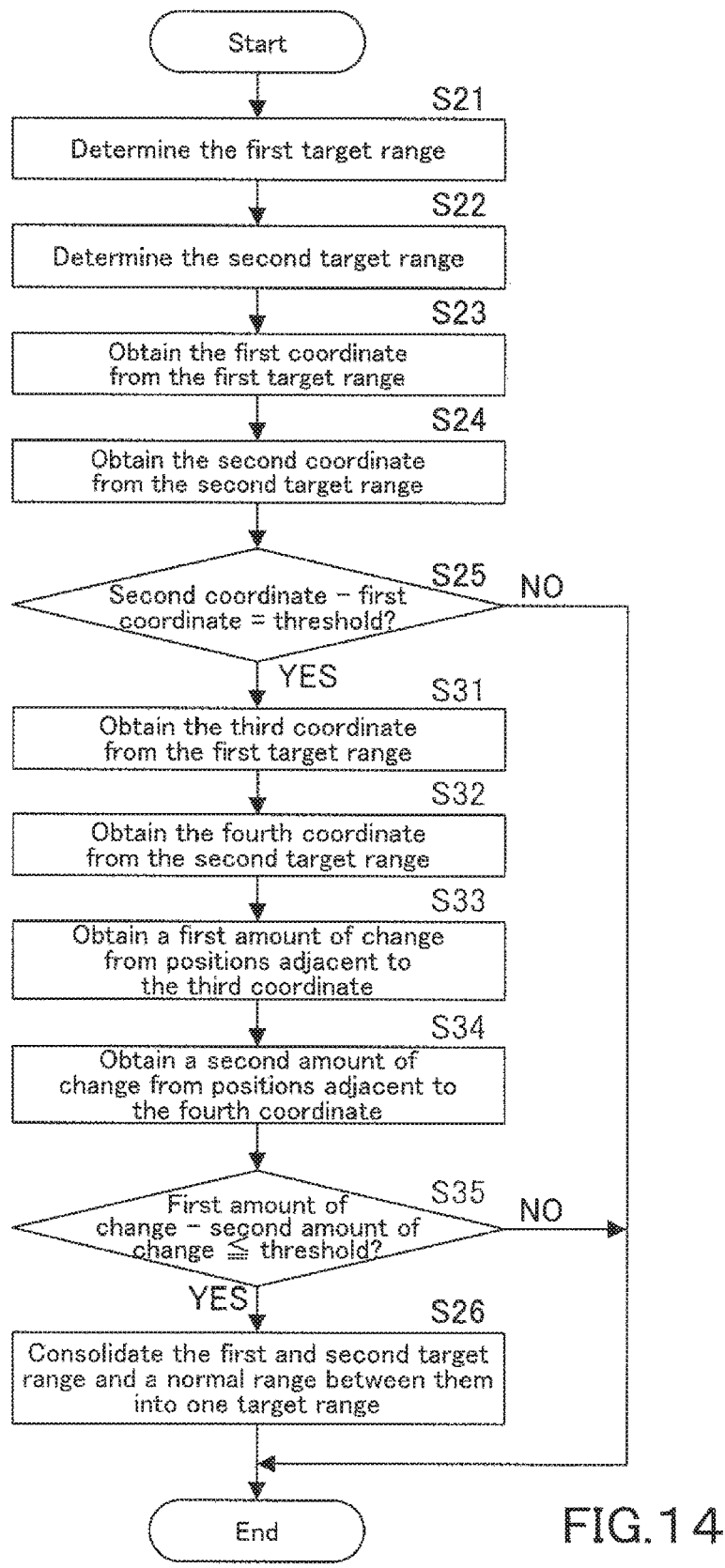
FIG. 14 is a flowchart representing a process of consolidating multiple target ranges for data replacement into one on the condition that these target ranges show similar characteristics of shading reference data when these are adjacent to each other.

FIG. 14 is a flowchart representing a process of consolidating the first target range R11, the second target range R12, and the normal range between the foregoing target ranges into one on the condition that the first target range R11 and the second target range R12 show similar characteristics of the shading reference data SH1, when the first target range R11 and the second target range R12 are adjacent to each other.

Here, a detailed description on Steps S21 to S25 of this figure is omitted because these steps are the same as Steps S21 to S25 of FIG. 12.

In Step S25, if the difference between the first and second coordinate is not equal to or below a threshold (NO in Step S25), the routine terminates. If it is equal to or below a threshold (YES in Step S25), the routine proceeds to Step S31.

Meanwhile, multiple peaks are detected. The start and end position of the first target range R11 are defined as the main scanning coordinates of the peaks P11 and P12, and the start and end position of the second target range R12 are defined as the peaks P21 and P22. The peak P11 on the first target range R11 and the peak P22 on the second target range R12 are more away from each other. In Step S31, the main scanning coordinate of the peak P11 is obtained as a third coordinate; in Step S32, the main scanning coordinate of the peak P22 is obtained as a fourth coordinate.

In Step S33, a first amount of change that is the average of the shade values at positions adjacent to the third coordinate is calculated; in Step S34, a second amount of change that is the average of the shade values at positions adjacent to the fourth coordinate.

In Step S35, it is judged whether or not the difference between the first and second amount of change is equal to or below a threshold. If it is equal to or below a threshold (YES in Step S35), the routine proceeds to Step S26 in which the first target range R11, the second target range R12, and the normal range between the foregoing target ranges are consolidated into one target range.

In Step S35, if it is not equal to or below a threshold (NO in Step S35), the routine terminates. So, the first target range R11 and the second target range R12 will be subjected to data replacement separately.

In this embodiment, the data replacement portion 140, shown in the block diagram of FIG. 3, replaces a part of data in the target range R1 with a substitute part of data, which will be further described below.

First, a substitute pixel generator 141 generates a substitute part of data. While the method of generating a substitute part of data is not limited to a specific one, it can be any of the following three methods, for example.

Figure 15:
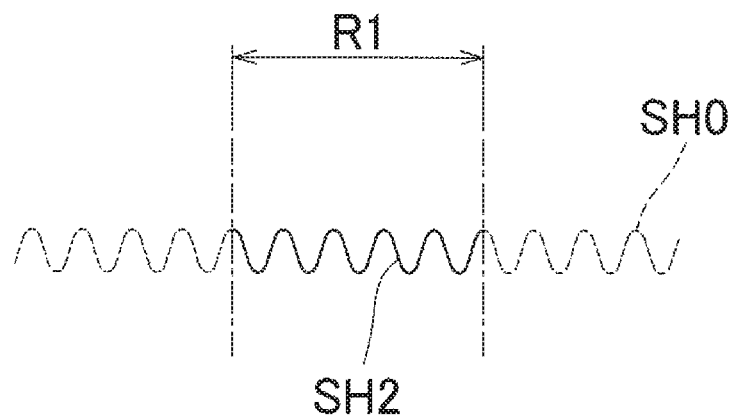
FIG. 15 is a view for reference in describing a method of generating a substitute part of data.

In the first method, the initial shading reference data SH0 obtained and stored in the early stage of use of the image forming apparatus is used as to be described with reference to FIG. 15. Specifically, a part of data in the range corresponding to the target range R1 is retrieved from the initial shading reference data SH0 and embedded as a substitute part of data SH2.

Figure 16:
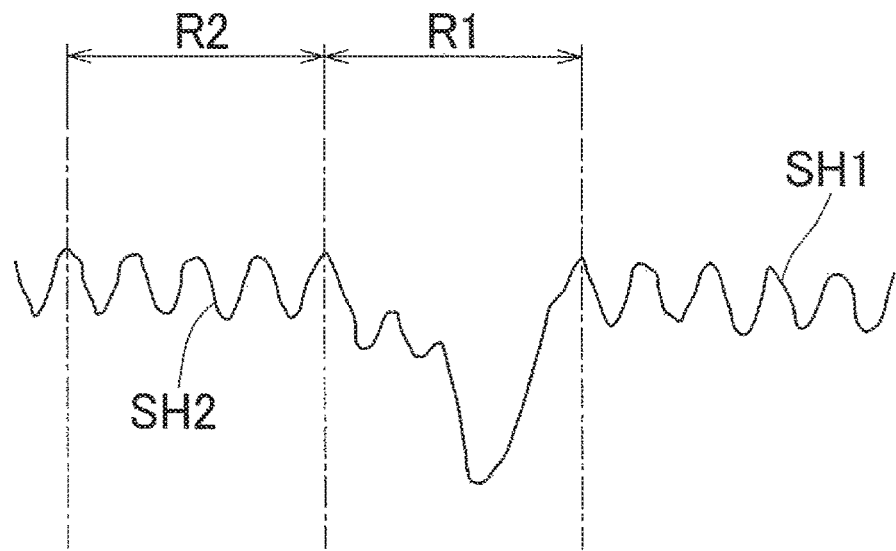
FIG. 16 is a view for reference in describing another method of generating a substitute part of data.

In the second method, as shown in FIG. 16, a part of data in the range corresponding to a range other than the target range R1 in the shading reference data (hereinafter to be also referred to as the uncorrected shading reference data) SH1, but adjacent to the target range R1, such as the target range R2, is retrieved from the initial shading reference data SH0 and embedded as a substitute part of data SH2.

Figure 17:
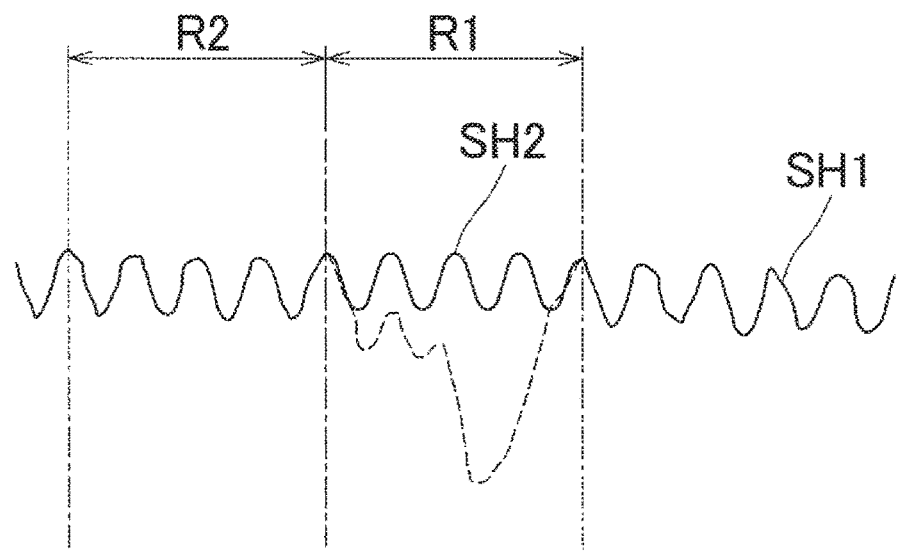
FIG. 17 is a view for reference in describing yet another method of generating a substitute part of data.

In the third method, as shown in FIG. 17, a part of data in the target range R1 is reshaped in a sine wave with reference to the characteristics of the uncorrected shading reference data SH1 and used as a substitute part of data SH2. Specifically, the number of peaks and the number of pixels from the rightmost to leftmost peak are counted from a predetermined range excluding the target range R1 in the uncorrected shading reference data SH1. The cycles of the sine-wave part of data in the predetermined range is calculated, and a dynamic range is calculated from the maximum and minimum shade value in the sine-wave part. A trigonometric function for generating a sine wave is thus calculated. Using the trigonometric function, the initial phase shade value for a sine wave is calculated from the position of pixel counted from the start position of the target range R1 in the uncorrected shading reference data SH1. The part of data in the target range R1 is then reshaped in a sine wave such that it maintains the obtained cycles and dynamic ranges until the end position of the target range R1.

A smoothing processor 142 performs a smoothing process on the substitute part of data SH2 obtained in the above-described manner such that the substitute part of data SH2 and the uncorrected shading reference data SH1 show approximately the same characteristics.

Figure 18A:
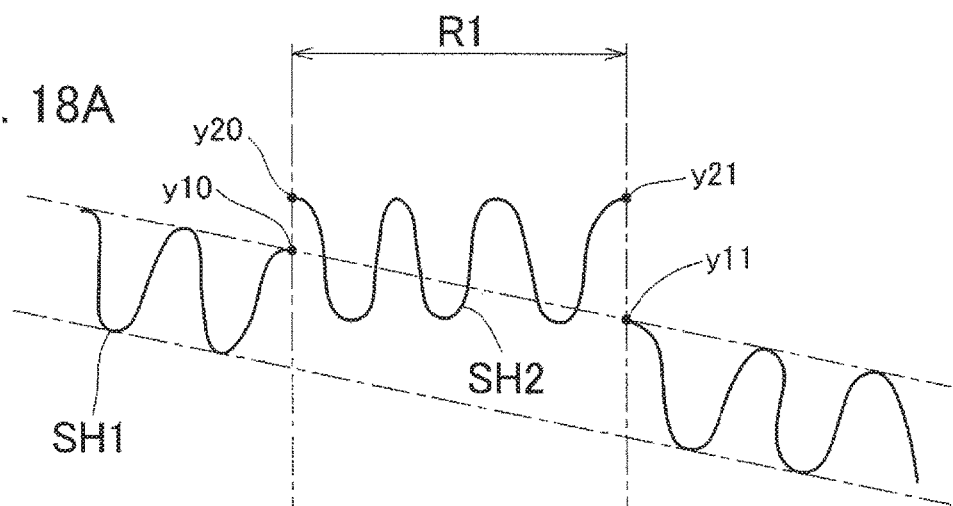
FIGS. 18A and 18B are views for reference in describing a process of ensuring continuity in the boundaries between the original and substitute part of data in the shading reference data.

As previously mentioned, the uncorrected shading reference data SH1 has possibly changed its characteristic because of a long-term use of the scanner unit 206, and it may slope upward or downward to the right, as shown in FIG. 18A. In this case, the shade value y10 at the start phase of the target range R1 is not the same as the shade value y11 at the end phase of the target range R1, accordingly. Obviously, the shade value y10 at the start phase of the target range R1 in the uncorrected shading reference data SH1 is not the same as the shade value y20 at the start phase of the substitute part of data SH2, and the shade value y11 at the end phase of the target range R1 in the uncorrected shading reference data SH1 is not the same as the shade value y21 at the end phase of the substitute part of data SH2. This means, there is discontinuity in shade value in the two boundaries between the uncorrected shading reference data SH1 and the substitute part of data SH2. To smooth out the difference in the shade values and ensure continuity in shade value in the two boundaries between the uncorrected shading reference data SH1 and the substitute part of data SH2, a smoothing process is performed.

There may be no affection yet by time-dependent deterioration. In this case, the shade value y10 at the start phase of the target range R1 is the same as the shade value y11 at the end phase of the target range R1 and there is no discontinuity in the two boundaries between the uncorrected shading reference data SH1 and the substitute part of data SH2. In this case, no smoothing process is necessary.

Specifically, in a smoothing process, the shade value y10 and the shade value y11 at the start and end phase of the target range R1 in the uncorrected shading reference data SH1 are obtained, and the shade value y20 and the shade value y21 at the start and end phase of the substitute part of data SH2 are also obtained, and then shade value correction data is obtained by calculating y10/y20 and y11/y21.

Figure 18B:
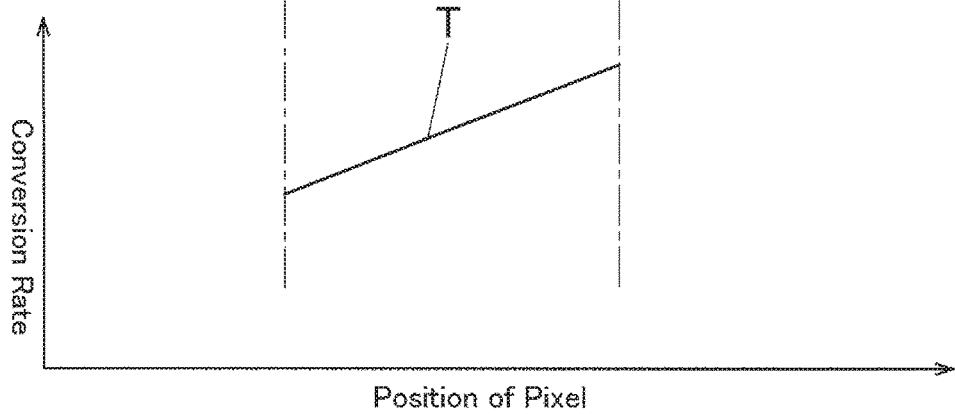

Subsequently, the shade value correction data (coefficients), the number N of pixels in the target range R1, and the position of pixel n counted from the start position of the target range R1 are substituted into the following linear expression to evaluate the conversion rate T: $\{(y10/y20) \times n + (y11/y21) \times (N-n)\}/N$. FIG. 18B indicates the graph of the conversion rate T.

A multiplication processor 143 generates adjusted shading reference data SH3 by multiplying the substitute part of data SH2 by the conversion rate T.

A selector 144 selects a part of data in the range excluding the range corresponding to the target range R1 from the uncorrected shading reference data SH1, and also selects the adjusted shading reference data SH3 obtained by the multiplication processor 143. The selector 144 then input the selected data to a shading reference data generator 145. By replacing a part of data in the target range R1 in the uncorrected shading reference data SH1 with the adjusted shading reference data SH3, the shading reference data generator 145 generates corrected shading reference data SH4.

Figure 19:
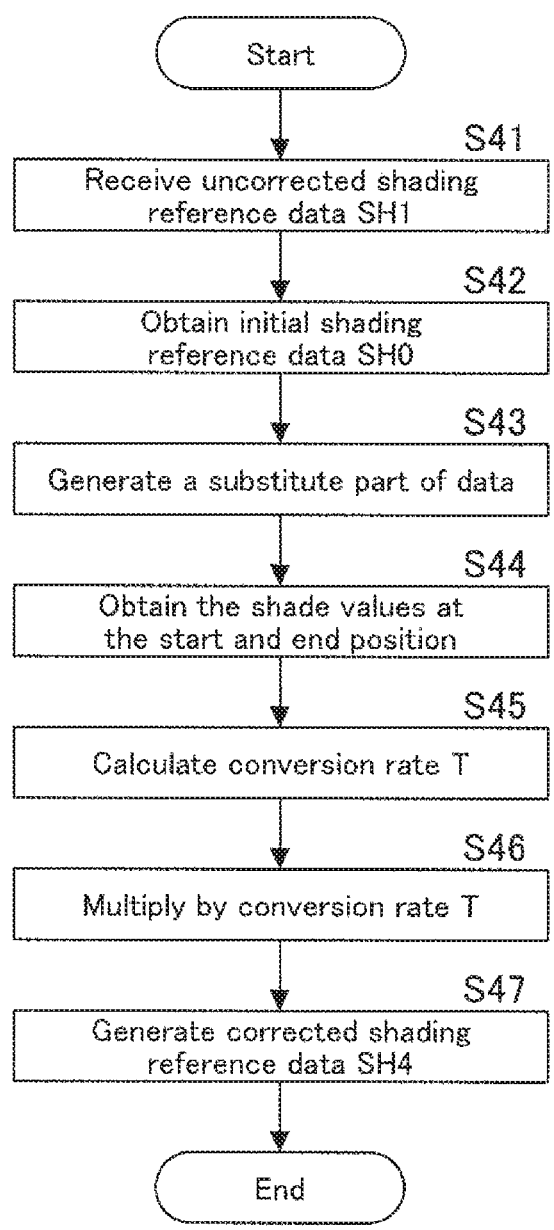
FIG. 19 is a flowchart representing a data replacement process.

FIG. 19 is a flowchart representing a data replacement process to be performed by the data replacement portion 140.

In Step S41, the uncorrected shading reference data SH1 is received; in Step S41, the initial shading reference data SH0 is obtained.

In Step S43, the substitute part of data SH2 is generated. The routine then proceeds to Step S44, in which the shade values at the start and end position of the target range R1 in the uncorrected shading reference data SH1 are obtained and the shade values at the start and end position of the substitute part of data SH2 are also obtained.

In Step S45, the conversion rate T is calculated; in Step S46, the adjusted shading reference data SH3 is generated by multiplying the substitute part of data SH2 by the conversion rate T. In Step S47, corrected shading reference data SH4 is generated by replacing a part of data in the target range R1 in the uncorrected shading reference data SH1 with the adjusted shading reference data SH3.

With reference to the corrected shading reference data SH4 obtained by the shading reference data generator 145, shading correction will be performed on the document image obtained by the data obtaining portion 120. The shading correction method will not be described since it is already a well-known technique. With reference to the corrected shading reference data SH4, the image forming apparatus is thus allowed to perform shading correction without causing streaks on the document image, because the corrected shading reference data SH4 has continuous shade values adjacent to the start and end phase of the target range R1 and the adjusted shading reference data SH3 in the target range R1 shows approximately the same characteristic as the uncorrected shading reference data SH1.

Figure 20A:
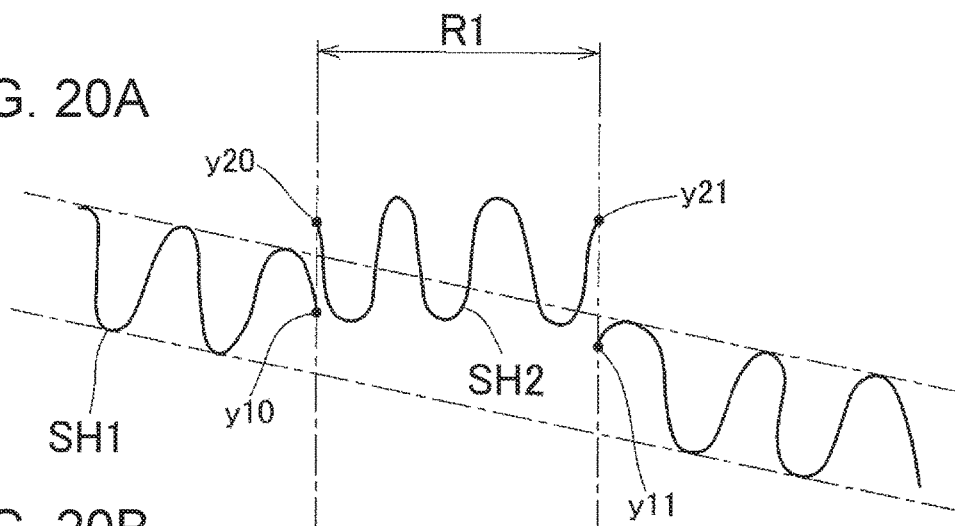
FIGS. 20A and 20B illustrate another example of a target range.
Figure 20B:
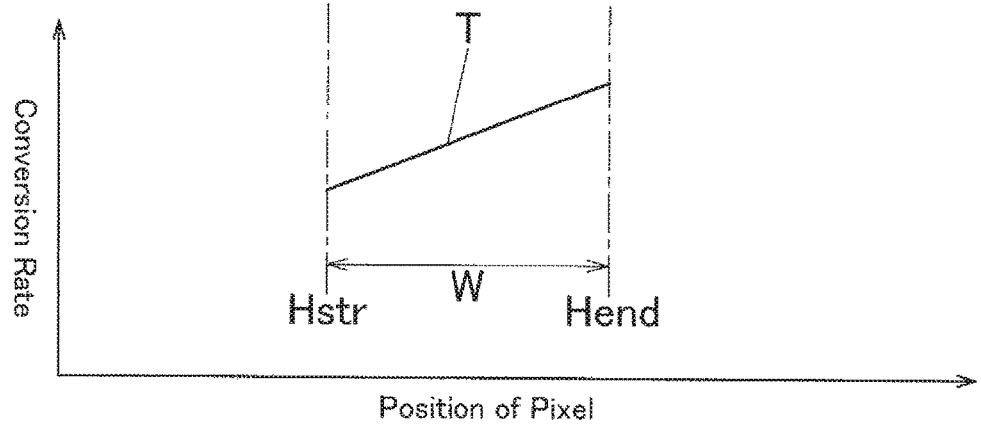

The present invention should not be limited to the above-described embodiment. For example, in the above-described embodiment, the start position Hpstr and the end position Hpend of the target range R1 are defined as the main scanning coordinates of the peaks P1 and P2 of a sine wave, which are to the right and left of the noise area W; however, the target range R1 should not be limited to what is defined in the above-described embodiment. Alternatively, the target range R1 may be constituted by the noise range W, as illustrated in FIG. 20, or may be constituted by a certain range including the noise range W at least. In this case, as illustrated in FIG. 20, the shade value y10 at the start phase of the target range R1 in the uncorrected shading reference data SH1 is not the same as the shade value y20 at the start phase of the substitute part of data SH2, and the shade value y11 at the end phase of the target range R1 in the uncorrected shading reference data SH1 is not the same as the shade value y21 at the end phase of the substitute part of data SH2, as in the above-described embodiment. So, it is preferred that a smoothing process be performed using the conversion rate T, which will smooth out the difference in the shade values and ensure continuity in shade value in the two boundaries between the uncorrected shading reference data SH1 and the substitute part of data SH2.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. An image reading device comprising:
a scanner that obtains image data by scanning an image, the scanner having characteristics of causing a distortion of gradation including a sine wave, the distortion of gradation being formed by the image data, the distortion of gradation being represented as an array of gradation values arranged in a main scanning direction;
a reference member to be scanned by the scanner for shading correction; and
a hardware processor that:
obtains a gradation value at each main scanning position from shading reference data, the shading reference data obtained by the scanner from the reference member;
determines a target range in the shading reference data based on the gradation value at the each main scanning position, the target range including a distorted waveform range in the shading reference data;
generates a substitute part of data to be replaced for an original part of data in the target range;
replaces the original part of data in the target range with the substitute part of data while the gradation values at the start and end phase of the substitute part of data are adjusted to the gradation values at the start and end phase of the target range in the shading reference data; and
generates the substitute part of data by using a sine wave on the basis of a trigonometric function obtained from the shading reference data;
wherein the hardware processor conducts data replacement by:

creating the conversion formula for converting the substitute part of data;

converting the substitute part of data by adjusting the gradation value at the each main scanning position of the substitute part of data using the conversion formula; and replacing the original part of data in the target range with the adjusted substitute part of data; and wherein the conversion formula is created by using coefficients and the number of pixels in the target range, the coefficients being calculated based on the ratio of the gradation value at the start and end phase of the target range in the shading reference data and the gradation value at the start and end phase of the substitute part of data.

2. The image reading device according to claim 1, wherein a foreign particle on the reference member causes the distorted waveform range in the shading reference data.

3. An image forming apparatus comprising the image reading device according to claim 1.

4. A method of replacing a part of shading reference data for an image reading device, the image reading device comprising:

a scanner that obtains image data by scanning an image, the scanner having characteristics of causing a distortion of gradation including a sine wave, the distortion of gradation being formed by the image data, the distortion of gradation being represented as an array of gradation values arranged in a main scanning direction; and a reference member to be scanned by the scanner for shading correction, the method comprising:

obtaining a gradation value at each main scanning position from shading reference data, the shading reference data obtained by the scanner from the reference member;

determining a target range in the shading reference data based on the gradation value at the each main scanning position, the target range including a distorted waveform range in the shading reference data;

generating a substitute part of data to be replaced for an original part of data in the target range; and replacing the original part of data in the target range with the substitute part of data while the gradation values at the start and end phase of the substitute part of data are adjusted to the gradation values at the start and end phase of the target range in the shading reference data;

wherein the substitute part of data is generated by using a sine wave on the basis of a trigonometric function obtained from the shading reference data;

wherein the hardware processor conducts data replacement by:

creating the conversion formula for converting the substitute part of data;

converting the substitute part of data by adjusting the gradation value at the each main scanning position of the substitute part of data using the conversion formula; and replacing the original part of data in the target range with the adjusted substitute part of data; and wherein the conversion formula is created by using coefficients and the number of pixels in the target range, the coefficients being calculated based on the ratio of the gradation value at the start and end phase of the target range in the shading reference data and the gradation value at the start and end phase of the substitute part of data.

5. The method of replacing a part of shading reference data according to claim 4, wherein a foreign particle on the reference member causes the distorted waveform range in the shading reference data.

6. A non-transitory computer-readable recording medium storing a program to make a computer of an image reading device implement the method of replacing a part of shading reference data according to claim 4.

* * * * *